(No Model.)
L. RAWCLIFFE.
Take up Hook for Ropes or Chains.
No. 240,271. Patented April 19, 1881.
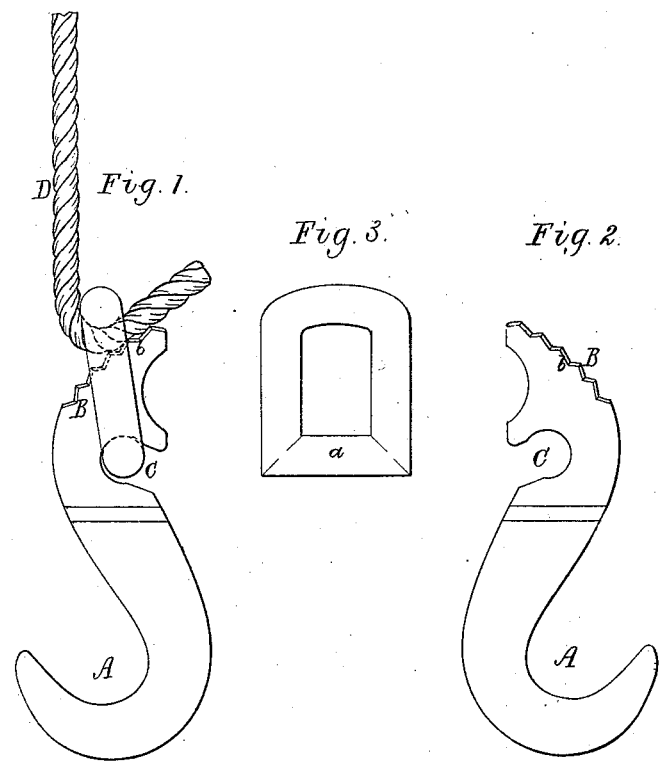
Witnesses.
S. N. Piper
C. B. Pratt
Inventor.
Lawrence Rawcliffe.
by R. H. Eddy atty.

UNITED STATES PATENT OFFICE.

LAWRENCE RAWCLIFFE, OF LAWRENCE, MASSACHUSETTS, ASSIGNOR TO HIMSELF AND RICHARD PRESTON, OF SAME PLACE.

TAKE-UP HOOK FOR ROPES OR CHAINS.

SPECIFICATION forming part of Letters Patent No. 240,271, dated April 19, 1881.

Application filed November 29, 1880. (No model.)

*To all whom it may concern:*

Be it known that I, LAWRENCE RAWCLIFFE, of Lawrence, of the county of Essex and State of Massachusetts, have invented a new and useful Improvement in Adjustable or Take-up Hooks for Ropes or Chains; and I do hereby declare the same to be described in the following specification, and represented in the accompanying drawings, of which—

Figure 1 is a side view of one of my said hooks and its link as applied to a rope. Fig. 2 is a side view of the hook, and Fig. 3 a side view of the link.

When a weight is attached to a rope, particularly that of the warp-beam of a loom, the stretching of the rope occasionally requires the weight to be adjusted higher on the rope. With my appliances, to be described, this can be easily accomplished.

In the drawings, A denotes a hook having at its upper part a binding-cam, B, and a link-receiving recess, C, all arranged and formed as represented. A link shaped as shown in Fig. 3 is used in connection with the said hook and its binding-cam, the latter being extended through the link, which in such case has its base portion *a* arranged within the recess C. The binding-cam has its bearing-surface notched, as shown at *b*. On a rope being passed through the link and against the binding-cam, in manner as shown in Fig. 1, in which the rope is denoted at D, the hook will be clutched to the rope, and as the downward draft on the hook may be increased such binding of the rope to the hook will be increased, the notches *b* of the binding-cam serving, with the link, to prevent the rope from slipping through the latter.

The link is cast or formed in one piece separate from the hook and its cam, which are also in one piece. The recess, by being oblique in the hook, as shown, prevents the link from accidentally slipping out of connection with the hook, when both hook and link are applied to a rope. As occasion may require, the hook and link can readily be slipped upward on the rope, though when the hook is drawn downward they will bind to the rope.

From the above it will be seen that with my invention it becomes an easy matter to adjust the hook to a rope after the latter may have become stretched by a weight applied to the hook.

I claim as my invention as follows:

1. The hook provided with the binding-cam and the link-receiving recess, as set forth.

2. The combination of the solid link with the hook, provided with the binding-cam, and the recess for reception of the link, all as specified.

LAWRENCE RAWCLIFFE.

Witnesses:
RICHARD PRESTON,
E. A. JOHNSON.